No. 754,005. PATENTED MAR. 8, 1904.
J. A. OLSON.
FIRE ALARM OR TEMPERATURE ANNUNCIATOR.
APPLICATION FILED AUG. 3, 1903.
NO MODEL.

Witnesses.
A. H. Opsahl
N. D. Kilgore

Inventor.
John A. Olson
By his Attorneys'
Williamson & Merchant.

No. 754,005. Patented March 8, 1904.

UNITED STATES PATENT OFFICE.

JOHN A. OLSON, OF MINNEAPOLIS, MINNESOTA, ASSIGNOR TO THE TEMPERATURE ANNUNCIATOR COMPANY, A CORPORATION OF MINNESOTA.

FIRE-ALARM OR TEMPERATURE-ANNUNCIATOR.

SPECIFICATION forming part of Letters Patent No. 754,005, dated March 8, 1904.

Application filed August 3, 1903. Serial No. 168,014. (No model.)

*To all whom it may concern:*

Be it known that I, JOHN A. OLSON, a citizen of the United States, residing at Minneapolis, in the county of Hennepin and State of Minnesota, have invented certain new and useful Improvements in Fire-Alarms or Temperature-Annunciators; and I do hereby declare the following to be a full, clear, and exact description of the invention, such as will enable others skilled in the art to which it appertains to make and use the same.

My invention has for its object to provide an improved alarm device especially adapted for use in connection with thermometers wherein a pointer is under varying temperatures moved over a dial; but my said invention is capable of more general use, as will be hereinafter noted.

To the above ends the invention consists of the novel devices and combinations of devices hereinafter described, and defined in the claims.

The invention is illustrated in the accompanying drawings, wherein like characters indicate like parts throughout the several views.

Figure 1:
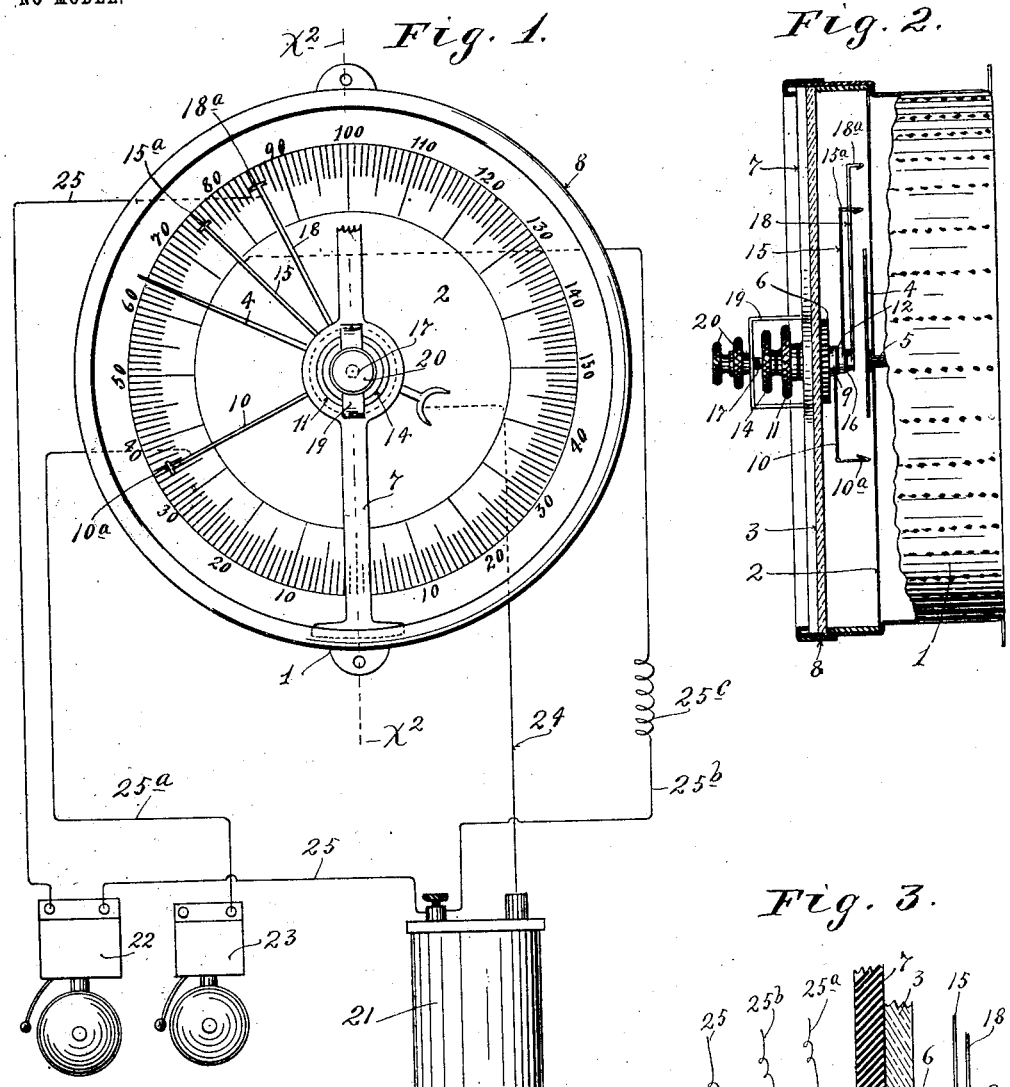
Figure 2:
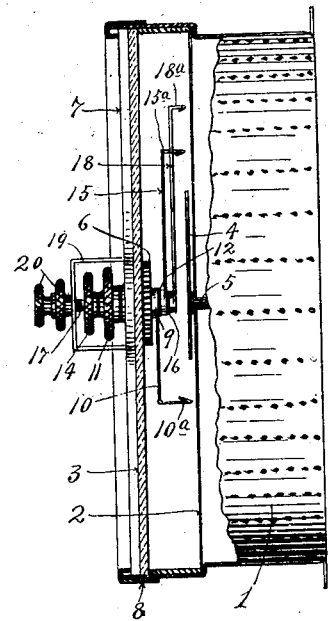
Figure 3:
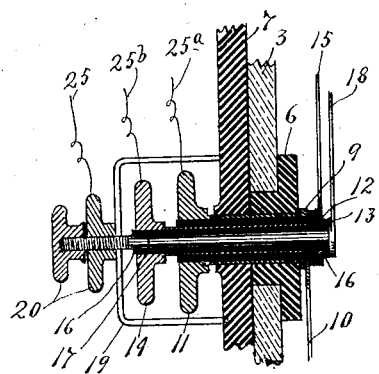

Figure 1 is a view, partly in diagram and partly in front elevation, showing a thermometer of standard construction with my invention applied thereto, some parts being broken away. Fig. 2 is a view, partly in elevation and partly in section, on the line $x^2\ x^2$ of Fig. 1; and Fig. 3 is a detail showing in section the electrode-actuating hubs, said parts being sectioned on the line $x^2\ x^2$ of Fig. 1.

The numeral 1 indicates the case, the numeral 2 the dial, the numeral 3 the transparent crystal, (preferably of glass,) and the numeral 4 the pointer, of an ordinary or standard thermometer wherein the pointer is vibrated over said dial by thermally-actuated devices, not necessary for the purposes of this case to consider. It may be further stated, however, that the pointer 4 is carried by a short shaft 5, to which the thermo-actuated controller (not shown) is connected, and that the said pointer is by its controller moved in the direction of the increasing numerals "0" to "150," as marked on the dial 2, under increasing temperature and is moved in a reverse direction under decreasing temperature.

At or in the vicinity of its center the crystal 3 is formed with a hole which is plugged by a disk-like bearing 6, of insulating material, preferably of wood fiber or vulcanized rubber.

In my previous experiences with devices of this character I have found that sometimes the heat from a fire, even though it does not otherwise damage the device, will break the crystal, and thus throw the operative parts of the mechanism out of action. To overcome this difficulty, I support the central bearing 6 not only by the crystal, but also independently of the crystal, by means of a rigid bar or strap 7, which, as shown, extends diametrically across the outer surface of the crystal and has its expanded ends seated in notches formed in the inturned flanges of a clamping-ring 8, which is frictionally held on the outer portion of the case 1 and also serves to hold the crystal in place.

Loosely mounted on the bearing 6 and extending through the bar 7 is a sleeve 9, provided at its inner extremity with a radially-projecting spring-arm 10, which constitutes an electrode and is adapted to spring laterally. At its outer end the sleeve 9 is provided with a knurled head 11, by means of which it may be turned. Within the sleeve 9 is an insulating-bushing 12, and within the bushing 12 is a second sleeve 13, provided at its outer end with a knurled head 14 and at its inner end with an electrode 15, similar to the electrode 10. Within the sleeve 13 is an insulating-bushing 16, and extending through the bushing 16 is a spindle 17, threaded at its outer end and provided at its inner end with an electrode 18, similar to the electrodes 10 and 15. The electrodes 10, 15, and 18 are provided at their free ends with beveled contact-points $10^a$, $15^a$, and $18^a$, respectively, with which the end of the pointer 4 is adapted to be engaged, as hereinafter described. The threaded outer end of the spindle 17 works loosely through a perforation in a spring-bracket 19, the ends of which bear against the bar 7, and outward of the said bracket said threaded end of the spindle is provided with a clamping-nut 20 and a knurled head 20ª.

By screwing the nut 20 against the spring-bracket 17 frictional tension is put upon all of the electrodes, so that they will not accidentally be moved from their set positions. The head 20ª serves as a finger-piece to turn the spindle and set its electrode 18 in any desired position.

In Fig. 1 the numeral 21 indicates a battery, and the numerals 22 and 23 electrically-actuated alarm-bells. One of the lead-wires 24 of the battery is electrically connected to the spindle 3 of the pointer 4, while the other lead-wire 25 is connected to both of the bells and to the electrode 26. A branch lead-wire 25ª extends from the bell 23 to the electrode 10. Another branch lead-wire 25ᵇ connects one pole of the battery 21 to the electrode 15. In the present instance a coil 25ᶜ is interposed in the branch lead-wire 25ᵇ.

The operation of the device is substantially as follows: Suppose, for instance, it is desired to indicate when the temperature within the vicinity of the device exceeds, say, 95° or falls below 35°. In this instance the electrodes 10 and 18 are adjusted as shown in Fig. 1. This being done, it is evident that whenever the temperature rises above or falls below the temperature indicated by the positions of the two electrodes the pointer 4 will be brought into contact with the cam end of one or the other of the said electrodes, and the circuit through the battery and one or the other of the bells will be closed, and the bell in the closed circuit will be sounded. The two bells 22 and 23 would be preferably constructed to produce different sounds, so that they will indicate when sounded whether the temperature has risen above or fallen below a certain point. Whenever the pointer passes and makes contact with the point 15ª of the electrode 15, the circuit through the magnetic coil 25ᶜ will be closed. The said coil may be utilized as the coil of an electromagnet, which may be arranged to perform any one of several different kinds of work—as, for instance, to control a furnace or to control the actuation of steam-valves.

It will of course be understood that the alarm-bells or other electrically-actuated elements in the several circuits may be located at any desirable points, either near to or remote from the instrument itself. It will also be understood that the device described is capable of modification within the scope of the invention herein set forth and claimed.

The device is herein termed a "fire-alarm," and while it is extremely well adapted for that purpose it is from a broad point of view an automatic temperature-indicator and is equally well adapted for use where low temperatures or, in fact, any degree of temperature is to be automatically determined and indicated. I contemplate using the same both in public and private buildings and in other places, such as cold-storage warehouses. Furthermore, certain features of the invention described are capable of use on pressure-gages and similar devices.

What I claim, and desire to secure by Letters Patent of the United States, is as follows:

1. A device of the character described, comprising a case having a dial, an automatically-actuated pointer, a plurality of electrodes coöperating with said pointer and having concentric stems insulated from each other, and an electric circuit including said pointer and said electrodes and involving an element which is actuated by the closing of the circuit between said pointer and one or the other of said electrodes, substantially as described.

2. In a device of the character described, the combination with a case having a dial and an automatically-actuated pointer, of a plurality of electrodes coöperating with said pointer and having concentric stems insulated from each other, a support for the said concentric stems, a spring-bracket through which the central member of the electrode-stems projects, a nut on the said projecting stem outward of said bracket, by the tightening of which all of the electrodes are set under friction, and an electric circuit including said electrodes and said pointer and involving an element which is actuated by the closing of the circuit between said pointer and one or the other of said electrodes, substantially as described.

3. In a device of the character described, the combination with a case having a dial and a coöperating automatically-actuated pointer, of a rigid bar or strap held by the said case and spaced outward from the dial, an electrode pivotally mounted at the central portion of said bar or strap and working between said strap and said dial and coöperating with said pointer, and an electric circuit including the said pointer and said electrodes and involving an element which is actuated by the closing of the circuit between said pointer and electrodes, substantially as described.

4. In a device of the character described, the combination with a case having a dial and a pointer, of a crystal supported by said case outward of said dial, a bearing at the central portion of said crystal, a rigid bar or strap held by said case and supporting said bearing independently of said crystal, an electrode journaled in said central bearing, and an electric circuit including said pointer and said electrode and involving an element which is actuated by the closing of the circuit between said pointer and said electrode, substantially as described.

In testimony whereof I affix my signature in presence of two witnesses.

JOHN A. OLSON.

Witnesses:
ELIZABETH KELIHER,
F. D. MERCHANT.